W. C. STEVENS.
GEAR SHIFTING MECHANISM.
APPLICATION FILED JUNE 5, 1920.

1,424,784.

Patented Aug. 8, 1922.
5 SHEETS—SHEET 1.

INVENTOR.
William C. Stevens
BY
ATTORNEY

W. C. STEVENS.
GEAR SHIFTING MECHANISM.
APPLICATION FILED JUNE 5, 1920.

1,424,784.

Patented Aug. 8, 1922.
5 SHEETS—SHEET 2.

INVENTOR.
William C. Stevens
BY Frank V. Hubbard
ATTORNEY

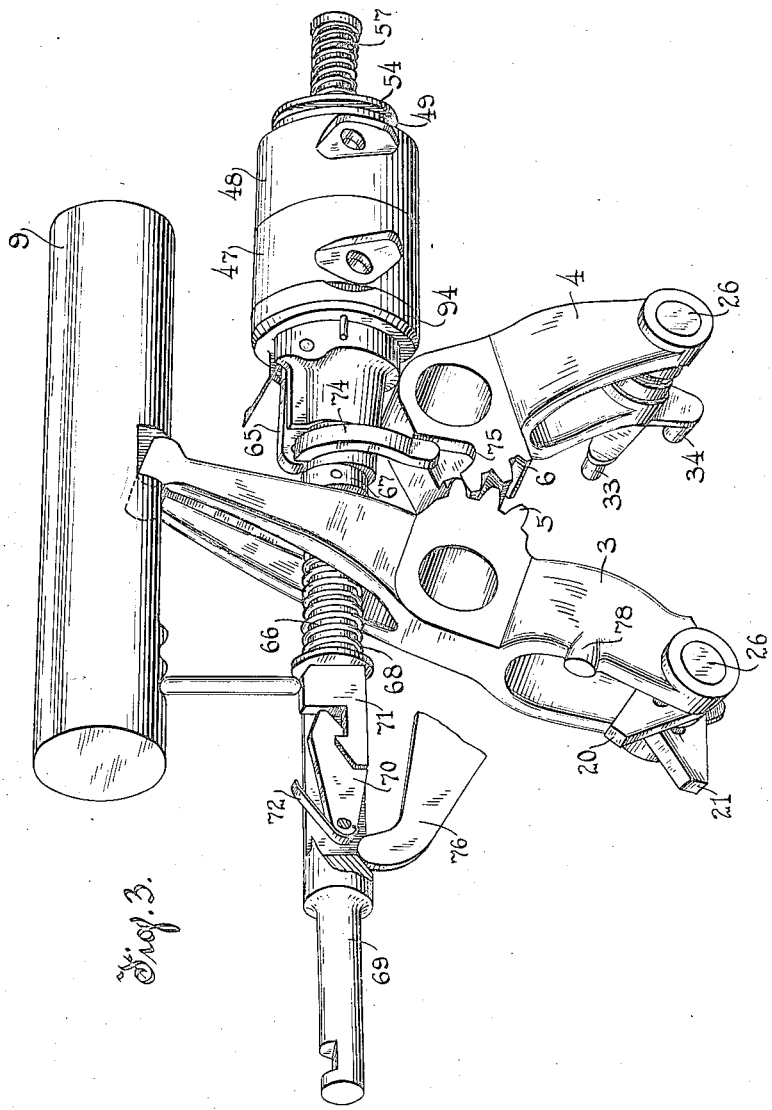

W. C. STEVENS.
GEAR SHIFTING MECHANISM.
APPLICATION FILED JUNE 5, 1920.
1,424,784.
Patented Aug. 8, 1922.
5 SHEETS—SHEET 4.
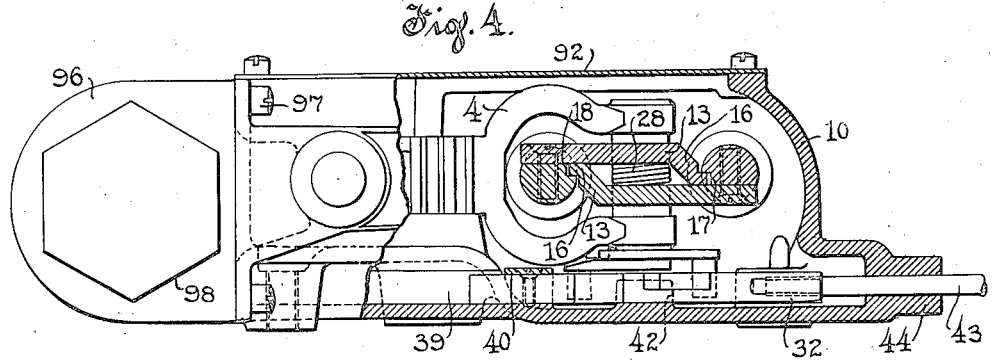
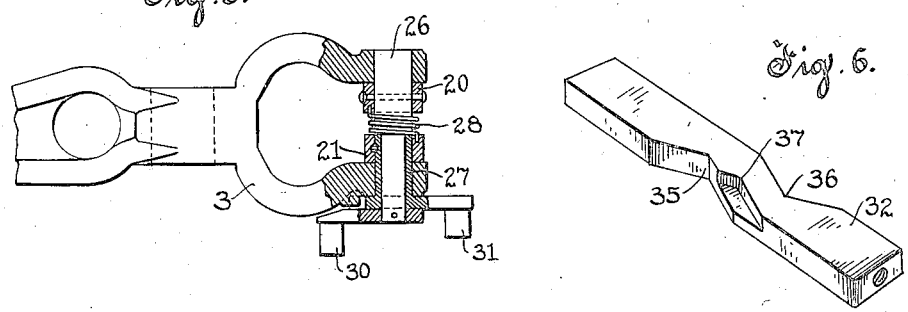
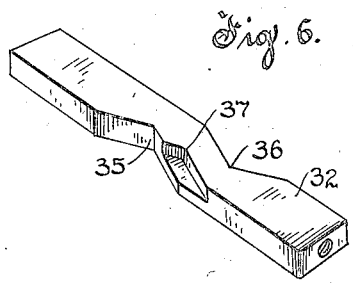
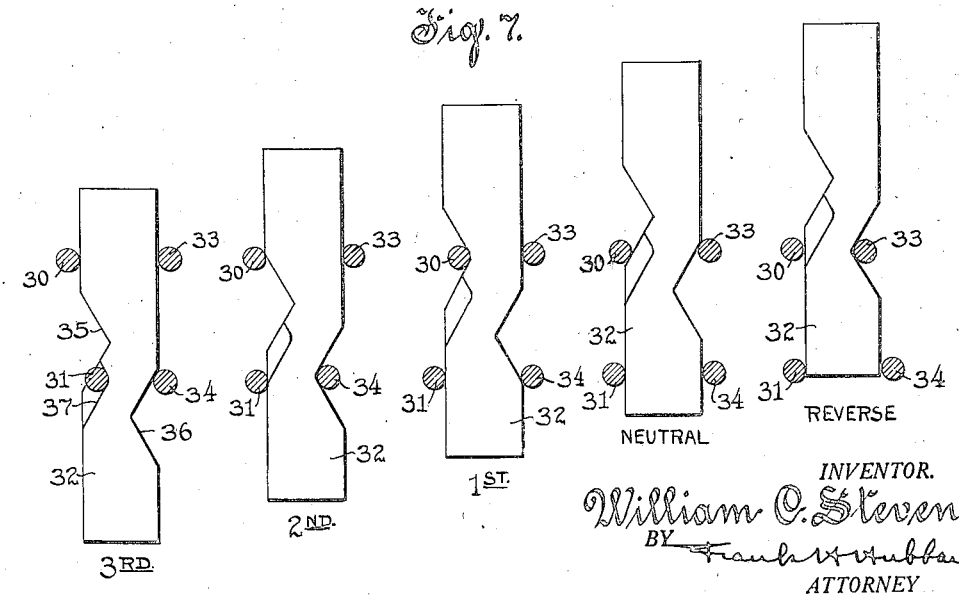
INVENTOR.
William C. Stevens
BY Frank H. Hubbard
ATTORNEY W. C. STEVENS.
GEAR SHIFTING MECHANISM.
APPLICATION FILED JUNE 5, 1920.
1,424,784.
Patented Aug. 8, 1922.
5 SHEETS—SHEET 5.
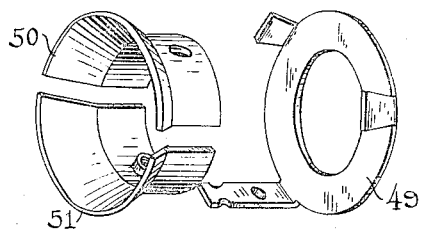
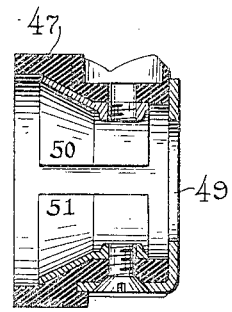
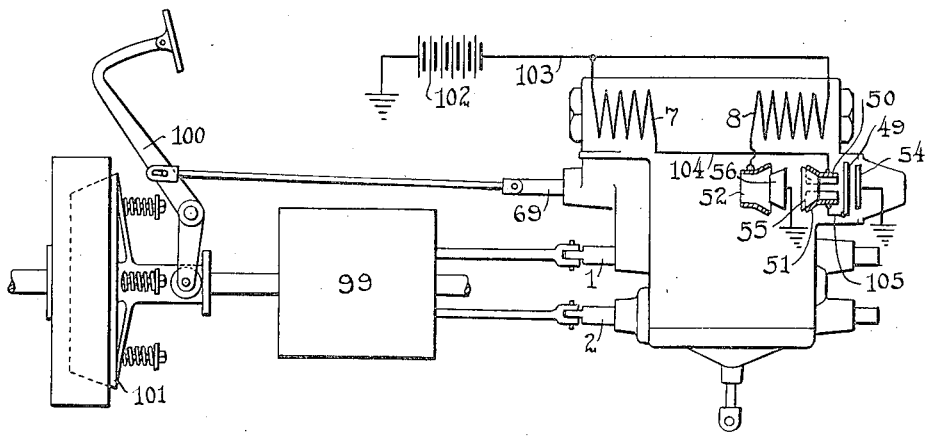
INVENTOR.
William C. Stevens
BY
ATTORNEY

UNITED STATES PATENT OFFICE.

WILLIAM C. STEVENS, OF MILWAUKEE, WISCONSIN, ASSIGNOR, BY MESNE ASSIGNMENTS, TO VULCAN MOTOR DEVICES COMPANY, A CORPORATION OF PENNSYLVANIA.

GEAR-SHIFTING MECHANISM.

1,424,784.        Specification of Letters Patent.        Patented Aug. 8, 1922.

Application filed June 5, 1920. Serial No. 386,852.

*To all whom it may concern:*

Be it known that I, WILLIAM C. STEVENS, a citizen of the United States, residing at Milwaukee, in the county of Milwaukee and State of Wisconsin, have invented new and useful Improvements in Gear-Shifting Mechanisms, of which the following is a full, clear, concise, and exact description, reference being had to the accompanying drawing, forming a part of this specification.

This invention relates to gear shifting mechanisms particularly adapted for automobiles.

More particularly the invention relates to mechanisms by means of which gear changes may be effected through operation of the automobile clutch lever or other suitable member following the setting of a suitable speed selector.

One object of the invention is to provide a simple, compact, rugged and durable mechanism which may be readily adapted to automobiles of different makes.

Another object is to provide a gear shifting mechanism requiring but a slight movement of the clutch lever or other control member and a minimum expenditure of manual energy for operation of such lever or other member.

Another object is to provide a gear shifting mechanism having electro-magnetic means for effecting both shifting and neutralizing operations thereof, the arrangement being such as to enable all shifting operations to be effected by a single electromagnet.

Another object is to provide a pre-selective gear shifting mechanism so designed that while the selector is in any speed position the gears may be neutralized by partial operation of the clutch lever and maintained in neutral relation upon release of the clutch lever for purposes hereinafter set forth.

Another object is to provide a pre-selective gear shifting mechanism so designed as to permit a change in selection during pause of the mechanism in neutral preparatory to shifting.

Another object is to provide an electromagnetically operated gear shifting mechanism wherein all electro-magnets are insured against needless energization.

Another object is to provide a gear shifting mechanism having means for positively locking the gears in meshed relation subject to release at will.

Various other objects and advantages of the invention will hereinafter appear.

One embodiment of the invention is illustrated in accompanying drawings and the same will now be described, it being understood that the mechanism illustrated is susceptible of various modifications without departing from the scope of the appended claims.

In the drawings,

Fig. 3 is a perspective view of parts of the mechanism.

Fig. 4 is a sectional view taken on line 4—4 of Fig. 1.

Figs. 5 and 6 are detail views of parts of the selecting mechanism.

Fig. 7 is a diagrammatic view showing the parts of Figures 5 and 6 in their different operative relations.

Figs. 8 and 9 are detail views of parts of a switch embodied in the mechanism, and Fig. 10 is a schematic and diagrammatic view of the mechanism associated with an automobile transmission, this view also showing one circuit arrangement for the mechanism.

Figure 1:
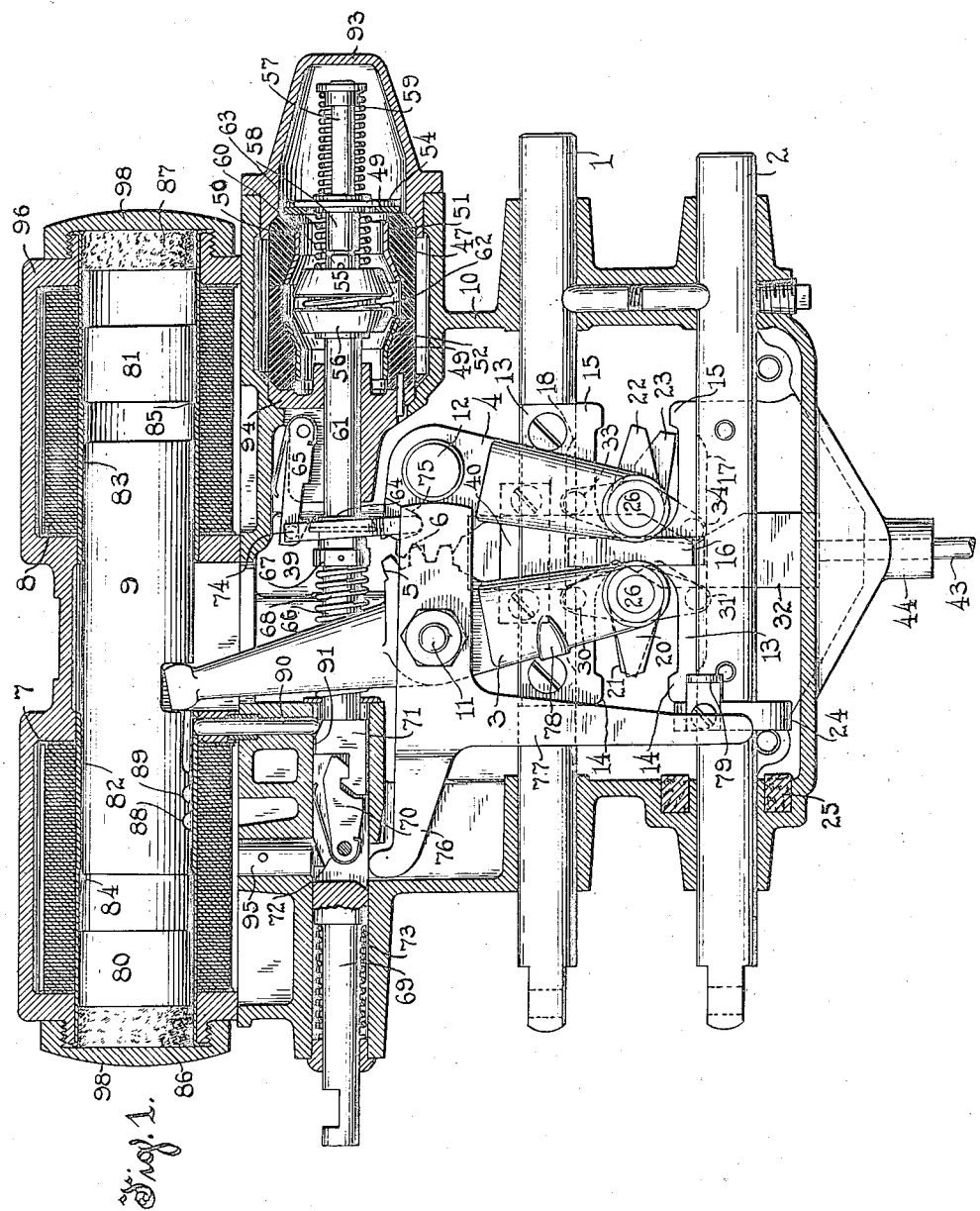
Fig. 1 is a horizontal sectional view of the mechanism with its parts in neutral relation.
Figure 2:
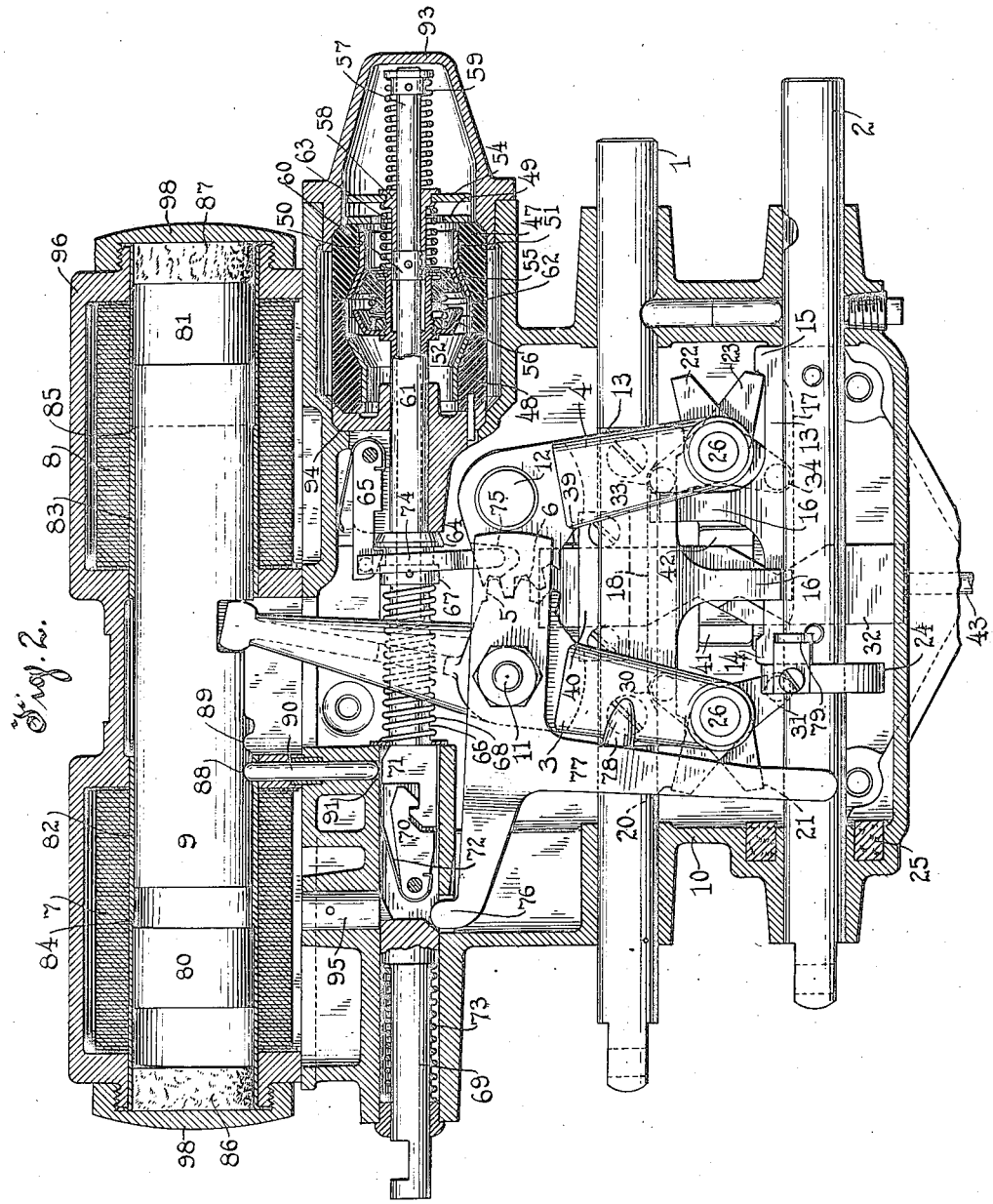
Fig. 2 is a similar view showing the parts in a relation for gear meshing.

Referring to Figs. 1 to 3, the mechanism includes reciprocable shift rods 1 and 2, pivoted arms 3 and 4 having meshing gear sectors 5 and 6 and operable to actuate said rods through media hereinafter described and solenoids 7 and 8 having a common core 9 for actuating the arms 3 and 4 through the medium of an extension of arm 3. The co-relation of elements is such that attraction of the core 9 by winding 7 forces the arms 3 and 4 towards one another to set rods 1 and 2 in neutral relation as shown in Fig. 1, while attraction of said core by the winding 8 spreads the arms as shown in Fig. 2 for movement of one or the other of the rods either to the right or to the left, means being provided as hereinafter set forth to insure operation of the rods singly and in a selected direction. The mechanism illustrated is particularly designed for a three speed and reverse automobile transmission gear, the rods 1 and 2 being provided for suitable connection to the shifting parts of such transmission gear.

The aforesaid mechanical elements are mounted in a casing 10, the shifting rods being reciprocably mounted therein in a parallel relation and the actuating arms being oscillatably mounted on studs 11 and 12 provided within said casing. Each shift rod has fixed thereto a plate 13 having at opposite ends lugs 14 and 15 and an intermediate lug 16, the lug 16 of shift rod 1 having its extremity offset as shown in Fig. 4 to project into a longitudinally extending groove 17 in shift rod 2 and the lug 16 of rod 2 having its extremity similarly offset to project into a longitudinally extending groove 18 in rod 1. These plates, which are interchangeable, thus interlock the rods against relative rotation and the lugs 16 thereof are disposed between and in the path of parts carried by the arms 3 and 4 whereby said rods are insured movement into the relation shown in Fig. 1 when said arms are moved towards one another. The end lugs of said plates on the other hand afford shoulders engageable by parts carried by the arms 3 and 4 for movement of the rods 1 and 2 to extreme positions as exemplified in Fig. 2 when said arms are spread.

The arms 3 and 4 are forked to straddle the shift rod 1 and are respectively provided with pairs of dogs 20—21 and 22—23 disposed between the shift rods and on opposite sides of the lug 16 of the plates carried by said rods. The dogs 20 and 21 carried by arm 3 are offset for engagement of the dog 20 with the end lug 14 of the plate carried by rod 1 and for engagement of the dog 21 with the end lug 14 of the plate carried by rod 2, while the dogs 22 and 23 of arm 4 are similarly offset for engagement of dog 22 with the end lug 15 of the plate carried by rod 1 and for engagement of dog 23 with the end lug 15 of the plate carried by rod 2. Thus, selective engagement of these dogs with their respective lugs on the rods 1 and 2 provide for selective operation of the rods in either direction by the solenoid 8, whereas the hubs of said dogs by engagement with the intermediate lugs 16 of the two shift rods provide for return of both rods to neutral relation from either extreme position by the solenoid 7. As will be understood, movement of each rod in opposite directions from neutral effects two of the four gear shifts, the rod 1 for example being utilized for selectively effecting setting of the gears for reverse and first speed forward and the rod 2 for second and third speeds forward. In practice the movement required of the shift rod for third speed is usually less than that required for other speeds and the rod utilized therefor is preferably provided with a collar 24 adapted by engagement with a buffer 25 provided in the casing to properly limit the throw thereof.

The dogs 20—21 and 22—23 are similarly mounted on their respective arms in a manner best illustrated in Fig. 5 which shows the arm 3. Referring to this figure, the dog 20, which is shown in section, is fixed to a spindle 26 oscillatably mounted in the forked end of the arm while the dog 21, which is also shown in section, is fixed to a sleeve 27 loosely mounted on a reduced portion of the spindle 26. The dogs are thus oscillatable into and out of operative relation with their respective shift rods being biased into operative relation therewith by a connecting spring 28 encircling the spindle 26. In practice, however, each dog must be capable of restraint in an inoperative relation with its respective shift rod in order to enable selective operation of said rods in opposite directions and to this end the spindle and sleeve carrying dogs 20 and 21 are provided with extensions carrying crank pins 30 and 31 respectively to engage a cam plate 32 reciprocably mounted in the casing. Similarly, the dogs 22 and 23 are provided with crank pins 33 and 34 respectively to also engage said cam plates all of said pins being biased against the cam plate by the springs 28. The cam plate as best shown in Figs. 6 and 7 is provided on opposite sides with staggered notches 35 and 36 and with a third notch 37, the notches 35 and 36 being open on both sides and the notch 37 closed on one side. The dimensions of the cam plate are such that the dogs are held out of operative relation with their respective shift rods except when the crank pin of each rests in one of the notches in said plate and the crank pin 31 is of such a length as to enter the notch 37 while the crank pin 30 is of such a length as to be capable of only entering the notch 35. The crank pins 33 and 34 are of the same length and either may enter the notch 36. Thus, as exemplified in Fig. 7, the cam plate is shiftable to permit the crank pins to selectively enter their respective notches, the three remaining crank pins being at the same time held in a relation to disengage their respective dogs from the shift rods. Also as exemplified in this figure, the cam is positionable to alternatively force all of the pins out of their respective notches and to thereby lock all of the dogs out of operative relation with respect to the shift rods for neutralizing. The cam plate 32 as best illustrated in Figs. 2 and 4 is slidably mounted on the bottom of the casing which is provided with a guide groove 39 for said plate, a plate 40 to retain the same in said groove and also a pair of guide lugs 41 and 42 for said cam plate at a distance from the end of said groove. A rod 43 attached to the cam plate extends through a bearing 44 in the casing wall for connection to suitable operating means preferably a lever mounted on the steering column. Thus by adjustment of the lever on the steering column the mechanism may be set for neutralizing the controlled gears or for shifting the same into any one of the different speed relations thereof by the solenoids.

The solenoids are controllable by a switch best illustrated in Figs. 2, 3, 8 and 9, said switch being designed for operation by the automobile clutch lever. This switch comprises a hollow cylindrical insulating base comprising sections 47 and 48, the section 47 carrying at one end an annular contact 49 and carrying interiorly a pair of contacts 50, 51 while the section 48 carries interiorly a contact 52. It further comprises a contact disc 54 to engage contact 49, a conical contact 55 to engage and bridge contacts 50 and 51 and a conical contact 56 to engage contact 52, the three contacts 54, 55 and 56 being supported on a spindle 57 extending through the base and reciprocably mounted as will hereinafter appear. The contact 54 is carried by a sleeve 58 surrounding the spindle 57 and free to slide thereon but biased by a spring 59 carried by said spindle to normally abut a collar 60 fixed to said spindle, said collar in the position of the spindle shown in Fig. 2 serving to force the contact 54 out of engagement with the contact 49. The contacts 55 and 56 are carried by another sleeve 61 slidably mounted on the spindle, the contact 56 being fixed to said sleeve and electrically connected thereto while the contact 55 is insulated from said sleeve and has a slight play thereon axially thereof, a spring 62 being interposed between contacts 55 and 56. The sleeve 61 is biased to move along the spindle in one direction by a spring 63 but is provided with a collar 64 engageable by a latch 65 to restrain it against such movement and the contacts 55 and 56 are so mounted upon the sleeve 61 that when so restrained contact 55 engages contacts 50 and 51 while contact 56 disengages contact 52. The sleeve 61, carrying contacts 55 and 56 is formed to telescopically receive the collar 60 and sleeve 59 whereby the spindle 57 may be moved to engage contact 54 with contact 49 without movement of contacts 55 and 56 and to compress the spring 63 to operate the contacts 55 and 56 upon release of sleeve 61. Such operation of the contacts 55 and 56 by the spring 63 serves to disengage the former contact from contacts 50 and 51 and to also engage contact 56 with contact 52, assuming that in the meantime the spindle 57 has been moved a given distance. On the other hand, assuming a lesser degree of movement of the spindle 57, release of the energy stored in the spring 63 merely disengages contact 55 from contacts 50 and 51.

As will appear, energization of the neutralizing solenoid is dependent upon engagement of contact 54 with contact 49 and simultaneous engagement of contact 55 with contacts 50 and 51 while energization of the shifting solenoid is dependent only upon engagement of contact 56 with contact 52. Thus, with the contacts 55 and 56 restrained in the respective positions shown in Fig. 2, the spindle 57 may be operated to engage contact 54 with contact 49 for energization of the neutralizing solenoid and to disengage said contacts for de-energization of said solenoid. On the other hand the switch is also adapted to de-energize the neutralizing solenoid by disengagement of contact 55 from contacts 50 and 51 upon release of the sleeve 61 and to then energize the shifting solenoid by engagement of contact 56 with contact 52 if in the meantime the spindle 57 has been moved an adequate distance. This provides for progressively energizing the neutralizing solenoid, then de-energizing said solenoid and finally energizing the shifting solenoid but it will be apparent that by arresting the spindle in a proper position the neutralizing solenoid may be de-energized by disengagement of contact 55 from contacts 50 and 51 without permitting contact 56 to engage contact 52 for energization of the shifting solenoid.

The spindle 57 is connected to a rod 66 having fixed thereto a collar 67 to abut the collar on sleeve 61 and said rod 66 is biased by a spring 68 surrounding the same and interposed between collar 67 and a part of the casing to bias the switch contacts into the relation shown in Fig. 2. On the other hand the rod 66 may be moved to the left to actuate the switch as above described, being adapted to be so operated through the medium of member 69 reciprocably mounted in the casing and having a releasable connection with said rod. Such releasable connection comprises a latch 70 carried by the member 69 and a keeper 71 carried by the rod 66, said latch and keeper being beveled for automatic latching under the influence of a spring 72 and said member 69 having associated therewith a spring 73 biasing the same towards the rod 66. This latch 70 and the latch 65 restraining the sleeve 61 are adapted to be tripped sequentially by operation of the shifting rods. The latch 65 has pivoted to the free end thereof a member 74 projecting into a socket 75 in the arm 4 to be lifted to trip said latch when the arms 3 and 4 are in neutral position as shown in Fig. 1. The latch 70 on the other hand has a tripping lever 76 pivoted on the fulcrum of the arm 3 and provided with an extension 77 to be engaged by a lug 78 on the arm 3, the arrangement being such that the tip of the lever 76 is projected against the latch to trip the latter when the arm 3 is moved to its extreme left hand position. Also the lever 76 is adapted to be similarly operated by a lug 79 provided on the collar 24 of shift rod 2 to co-operate with the extension 77 of said lever. Such additional actuating means for the lever 76 is provided because of the fact that the collar 24 curtails the movement of the shift rod 2 to the left thereby likewise curtailing movement of the arm 3 to render the same ineffective to actuate the lever 76 as desired for this particular gear setting.

Thus assuming the parts to be in the gear setting relation shown in Fig. 2, movement of the member 69 to the left as by the clutch lever operates the switch as above described to engage contacts 54 and 49 to energize the neutralizing solenoid. The neutralizing solenoid thereupon moves the arms 3 and 4 to the position shown in Fig. 1 thereby tripping the latch 65 and consequently allowing the switch contacts to assume the relative positions also shown in Fig. 1 which as above described de-energizes the neutralizing solenoid. With the parts in such a relation the rod 69 may be released to restore the switch contacts to the relation shown in Fig. 2 or its operation may be continued. Such continued operation of the member acts through the spindle 57 and springs 59 and 63 to engage contacts 56 with contact 52 to energize the shifting solenoid with the result of again spreading the arms 3 and 4 thereby actuating the lever 76 either through the medium of the lug 78 on the arm 3 or the lug 79 on the shift rod 2 to trip the latch 70. This frees the rod 66 from the member 69, allowing said rod to move under the influence of spring 68 to restore the switch parts to the relation shown in Fig. 2 thereby de-energizing the shifting solenoid. Thus both the neutralizing and shifting solenoids are de-energized immediately upon completion of the work thereof and the switch is so designed that upon restoration to the relation shown in Fig. 2 the contact 54 disengages contact 49 prior to re-engagement of contact 55 with contacts 50 and 51 thereby insuring against re-energization of the neutralizing solenoid. Furthermore whenever the contacts are restored to the relation shown in Fig. 2 while the mechanism is neutralized the latch 65 is held tripped so that upon subsequent operation of the switch by member 69 to energize the shifting solenoid the contact 55 will disengage contacts 50 and 51 prior to engagement of contact 54 with contact 49, thereby insuring against re-energization of the neutralizing solenoid during such operation. As will be apparent, the spring 63 functions to insure this result when the latch 65 is held tripped as described. Also as will be apparent release of the member 69 after tripping of the latch 70 will serve to effect reconnection of said member with the switch to enable subsequent operation of the latter.

The shifting and neutralizing solenoids are designed to have varying pull curve characteristics providing for an increase of the initial pull of each to mesh or de-mesh the gears as the case may be. To this end the windings 7 and 8 are respectively provided with movable magnetic cores 80 and 81 to seal with the ends of the plunger 9, said cores, however, having their movement limited to provide an air gap between the core 80 and plunger 9 when the latter is in its extreme right hand position and an air gap between the core 81 and the plunger 9 when the latter is in its extreme left hand position. More specifically the windings 7 and 8 are respectively provided with non-magnetic sleeves 82 and 83 for the plunger 9 and the cores 80 and 81, said cores being of slightly greater diameter than the plunger and said sleeves being provided with sections of increased interior diameter to provide annular shoulders 84 and 85 to serve as stops for the cores 80 and 81 respectively. As will be understood each of the cores serves to divide the air gap of its respective solenoid with the result aforesaid and thus the solenoids serve to insure positive and quick operation of the mechanism for both neutralizing and shifting. Moreover, the solenoids are respectively provided with buffers 86 and 87 to take the impact of the cores, thus rendering said solenoids exceedingly quiet in operation.

The plunger 9 of the solenoids is provided with notches 88 and 89 to receive the end of a pin 90 reciprocably mounted in the casing and resting upon a cam surface 91 of the keeper 71 of the reciprocating rod 66.

As shown in Fig. 1, such cam surface permits the pin to drop when the switch is initially operated for neutralizing and as shown in Fig. 2, said surface functions to project said pin upon completion of a shifting operation. Upon movement of shift rod 1 to its extreme right hand or its extreme left hand position, or upon movement of shift rod 2 to its extreme right hand position, the solenoid plunger 9 moves to its extreme right hand position and notch 88 is then positioned to receive pin 90 upon projection thereof. However, as before stated, movement of shift rod 2 to its extreme left hand position is limited by engagement of collar 24 with buffer 25 and solenoid plunger 9 is then positioned so that notch 89 receives pin 90 upon projection thereof. When either of the shift rods is moved to its extreme position, the selector dog remains in engagement therewith and it is thus apparent that locking of the solenoid plunger by the pin serves to effectually lock the mechanism in its different gear shifting positions subject to release only upon subsequent operation of the switch for neutralizing.

The casing 10 comprises a casting to receive all parts of the mechanism except the solenoid windings, said casting having a cover plate 92, Fig. 4, which is removable to give ready access to all parts of the mechanism except the master switch and its operating means. The casing has a cylindrical section in which the switch mechanism is mounted and enclosed, said casing section being provided with a removable cover 93 and a removable end block 94 carrying the latch 70 and providing a bearing for the sleeve 61. Thus the parts of the switch are accessible only upon removal of the same, but said switch is so designed and mounted as to be readily removable as a unit upon removal of the cover 93 and tripping of the latch 70. Upon removal of the switch mechanism the member 69 carrying the latch 70 is also readily removable. This member is normally held against a stop pin 95 mounted in the casing but this pin which is accessible from the exterior of the casing may be withdrawn to permit member 69 to be removed from its bearing upon withdrawal of the keeper 71 and the member carrying the same. The solenoid windings are mounted in a separate housing 96 which is secured to the casting by screws 97 as shown in Fig. 4, said housing being longitudinally open adjacent the casting and having removable end caps 98 whereby all parts of the solenoids are readily accessible.

Referring to Fig. 10 which diagrammatically shows the shifting mechanism associated with an automobile transmission, the shift rods 1 and 2 are connected to elements within the transmission gear box 99 while the switch actuating member 69 is connected to the clutch operating lever 100. The member 69 has a lost motion connection with the lever 100 whereby the former is operatable by the latter only after disengagement of the clutch 101. Thus the clutch lever may be operated as is customary without operation of the shifting mechanism whereas upon continued operation it also serves to operate the switch as above described and with the circuit arrangement illustrated, operation of the clutch lever to engage contacts 54 and 49 completes circuits from a battery 102 by conductor 103 through the solenoid winding 7 by conductor 104 through contacts 50, 55 and 51 by conductor 105 through contacts 49 and 54 back to the battery through a ground connection. On the other hand when the latch 65 of the switch is tripped to effect dis-engagement of contact 55 from contacts 50 and 51, the circuit of winding 7 is interrupted and when the clutch lever is operated to engage contact 56 with contact 52, circuit is completed from the battery 102 by conductor 103 through winding 8 and thence through contacts 52 and 56 to ground. This energizes the winding 8 subject to de-energization upon tripping of the latch 70 which allows the switch contacts to return to the positions illustrated in Fig. 2.

From the foregoing it will be observed that by proper operation of the selector cam plate through the medium of rod 43 and by subsequent operation of the clutch lever, the mechanism may be caused to operate to set the controlled gears either in neutral relation or in any desired speed relation. Also inasmuch as the mechanism permits a pause in neutral relation preparatory to shifting, a change in selection may even be made during a shifting operation, i. e. during such pause. Moreover, following a pause in neutral, the clutch lever may be released to re-engage the clutch, the clutch lever being thereafter operable to disengage the clutch and energize the shifting solenoid to effect the preselected gear shift without re-energizing the neutralizing solenoid. Thus by properly controlling the engine speed when the clutch is so re-engaged the gears may be synchronized to minimize clashing during the following gear shift. In other words the mechanism permits an inexperienced operator to readily accomplish the socalled "double shift" which heretofore has only been accomplishable by the most skillful drivers. Also the aforesaid characteristic of the mechanism is very advantageous in that it enables re-engagement of the clutch during stops at crossings and during coasting without requiring neutralizing operation of the selector.

What I claim as new and desire to secure by Letters Patent is:

1. In a gear shifting mechanism for automobiles, in combination, a plurality of electro-magnets, means including parts operable by certain of said electro-magnets to effect a plurality of gear changes selectively and returnable to neutral by certain of said electro-magnets and control means for said neutralizing and shifting electro-magnets subjecting the same to control by the automobile clutch lever for energization and to control by said first-mentioned means for de-energization.

2. In a gear shifting mechanism for automobiles, in combination, a plurality of electro-magnets, means including parts operable by certain of said electro-magnets to effect a plurality of gear changes selectively and returnable to neutral by certain of said electro-magnets and control means for said electro-magnets subjecting the same to control by the automobile clutch lever for energization of the neutralizing and shifting electro-magnets progressively upon a given movement of said lever and for energization of only the former electro-magnet upon a given lesser movement of said lever.

3. In a gear shifting mechanism for automobiles, in combination, a plurality of electro-magnets, means including parts operable by certain of said electro-magnets to effect a plurality of gear changes selectively and returnable to neutral by certain of said electro-magnets and control means for said electro-magnets subjecting the same to control by the automobile clutch lever and said last-mentioned means for energization of both the neutralizing and shifting electro-magnets upon a given movement of said lever but insuring against energization of the latter until after response of the former.

4. In a gear shifting mechanism for automobiles, in combination, a plurality of electro-magnets, means including parts operable by certain of said electro-magnets to effect a plurality of gear changes selectively and returnable to neutral by certain of said electro-magnets and control means for said electro-magnets subjecting the same to control by the automobile clutch lever for energization of said neutralizing and shifting electro-magnets progressively but only upon a given movement of said lever, said control means enabling energization of the neutralizing electro-magnet upon a given lesser movement of said lever and providing for de-energization of each of said electro-magnets automomatically upon performance of its work.

5. In a gear shifting mechanism for automobiles, in combination, a plurality of electro-magnets, means including parts operable by certain of said electro-magnets to effect a plurality of gear changes selectively and returnable to neutral by certain of said electro-magnets and control means for said electro-magnets subjecting the same to control by the automobile clutch lever, said means necessitating movement of said lever to a given position for energization of the neutralizing electro-magnet and continued movement of said lever to another position for energization of the shifting electro-magnet, whereby said lever may be operated for progressively dis-engaging the clutch, neutralizing the gear shifting means, re-engaging the clutch, again disengaging the clutch and effecting operation of the gear shifting means for a speed change.

6. In a gear shifting mechanism for automobiles, in combination, a plurality of electro-magnets, means including parts operable by certain of said electro-magnets to effect a plurality of gear changes selectively and returnable to neutral by other of said electro-magnets and control means for said electro-magnets subjecting the same to control by the automobile clutch lever for energization of said neutralizing and shifting electro-magnets progressively upon a given movement of said lever, said control means effecting de-energization of each of said electro-magnets automatically upon performance of its work and rendering said lever ineffective to energize said neutralizing electro-magnet while the mechanism is neutralized.

7. In a gear shifting mechanism, in combination, a plurality of electro-magnets, gear shifting means including parts operable by certain of said electro-magnets to effect a plurality of gear changes selectively, said parts being also operable by certain of said electro-magnets to neutralize the controlled gears and control means for said electro-magnets including a manual control member common thereto and operable to effect energization thereof, said control means further including means for de-energizing each of said electro-magnets automatically upon performance of its work.

8. In a gear shifting mechanism, in combination, a plurality of electro-magnets, gear shifting means including parts operable by certain of said electromagnets to effect a plurality of gear changes selectively, said parts being operable also by certain of said electro-magnets to neutralize the controlled gears and control means for said electro-magnets including a control member common thereto to direct energization thereof and further including means operable by the first-mentioned means to necessitate neutral positioning of the latter prior to energization of the shifting electro-magnet.

9. In a gear shifting mechanism, in combination, a plurality of electro-magnets, gear shifting means including parts operable by certain of the same to effect a plurality of gear changes selectively, said parts being also operable by certain of said electro-magnets to neutralize the controlled gears and control means for said electro-magnets including a manual control element common thereto and operable to effect energization thereof and further including means rendering said element ineffective to energize the neutralizing electro-magnet while said gear shifting mechanism is neutralized and ineffective to energize the shifting electro-magnet until said mechanism is first neutralized.

10. In a gear shifting mechanism, in combination, a plurality of electro-magnets, gear shifting means including parts operable by certain of the same to effect a plurality of gear changes selectively, said parts being also operable by certain of said electro-magnets for neutralization thereof and control means for said electro-magnets including independent sets of contacts for controlling the circuits thereof, a common control element for said contacts and connection between certain of said contacts and said element to effect operation of the former upon unidirectional operation of the latter for progressively energizing and de-energizing the neutralizing electro-magnet and energizing the shifting electro-magnet, 11. In a gear shifting mechanism, in combination, a plurality of electro-magnets, gear shifting means including parts operable by certain of the same to effect a plurality of gear changes selectively, said parts being also operable by certain of said electro-magnets for neutralization thereof and control means for said electro-magnets including independent sets of contacts for controlling the circuits thereof, a common control element for said contacts and connection between certain of said contacts and said element to effect operation of the former upon unidirectional operation of the latter for progressively energizing and de-energizing the neutralizing electro-magnet and energizing the shifting electro-magnet, said connections insuring against energization of the neutralizing electro-magnet upon reverse movement of said element.

12. In a gear shifting mechanism, in combination, a plurality of electro-magnets, means including parts operable by certain of said electro-magnets to effect a plurality of gear changes selectively and returnable to neutral by certain of said electro-magnets, independent sets of contacts for controlling the circuits of said electro-magnets, a common control element for said contacts, connections between said element and certain of said contacts to effect operation of the latter upon unidirectional movement of the former for progressively energizing and de-energizing the neutralizing electro-magnet and energizing the shifting electro magnet and means also subjecting said contacts to control by the first-mentioned means to de-energize each of said electro-magnets upon fulfillment of its function.

13. In a gear shifting mechanism, in combination, a plurality of electro-magnets, means operable thereby for both shifting and neutralizing the controlled gears and control means for said electro-magnets including a plurality of sets of contacts in series with the neutralizing electro-magnet, one of said sets of contacts being controllable at will and means subjecting the other of said sets of contacts to control by said first-mentioned means to restrain certain of the same in circuit closing positions subject to release to interrupt circuit automatically upon neutralization of said first-mentioned means.

14. In a gear shifting mechanism, in combination, a plurality of electro-magnets, means operable thereby for both shifting and neutralizing the controlled gears and control means for said electro-magnets including a plurality of sets of contacts in series with the neutralizing electro-magnet one of said sets of contacts being controllable at will and further means subjecting the other of said sets of contacts to control by said first-mentioned means for restraint and release in different positions of the latter, said contacts being associated to complete the circuit of the neutralizing solenoid only upon a given operation of the first-mentioned contacts while the others are restrained against operation.

15. In a gear shifting mechanism, in combination, a plurality of electro-magnets, means operable thereby for shifting and neutralizing the controlled gears, a set of contacts in circuit with the shifting electro-magnet and plurality of sets of contacts in series with the neutralizing electro-magnet and a common control element for said first-mentioned set of contacts and one of said second-mentioned sets of contacts to effect completion of circuit thereby and means for retaining said first-mentioned contacts in circuit interrupting relation and said last-mentioned contacts in circuit closing relation subject to release of both upon neutralization of said first-mentioned means.

16. In a gear shifting mechanism, in combination, an electro-magnet, means operable thereby for gear shifting, said means being movable different degrees for different gear shifts, a control switch for said electro-magnet, an operating member for said switch, a releasable connection between said switch and its operating member, and a single tripping element for said connection operable directly by different elements of said first-mentioned means to insure tripping of said cʳ nection upon completion of each shifting operation regardless of the degree of movement of said means incident thereto.

17. In a gear shifting mechanism in combination, a plurality of electro-magnets, means operable by one of said electro-magnets for gear shifting and by another of said electro-magnets for neutralizing, said means being adjustable to effect a plurality of gear shifts selectively and control means for said electro-magnets rendering the same energizable selectively according to the position of said first-mentioned means.

18. In a gear shifting mechanism in combination, a plurality of electro-magnets, means operable by one of said electro-magnets for gear shifting and by another of said electro-magnets for neutralizing, said means being adjustable to effect a plurality of gear shifts selectively and control means for said neutralizing and shifting electro-magnets rendering the same energizable progressively when said first-mentioned means is in a gear shifting position but insuring against energization of said shifting electro-magnet until said first-mentioned means is returned to neutral position.

19. In a gear shifting mechanism in combination a plurality of electro-magnets, means operable by one of said electro-magnets for gear shifting and by another of said electro-magnets for neutralizing, said means being adjustable to effect a plurality of gear shifts selectively and control means for said neutralizing and shifting electro-magnets rendering the same energizable progressively when said first-mentioned means is in a gear shifting position, said control means insuring against energization of said shifting electro-magnet until said first-mentioned means is returned to neutral and insuring against needless energization of either electro-magnet.

20. In a gear shifting mechanism, in combination, a plurality of electro-magnets, means including parts operable by one for gear shifting and adjustable to effect a plurality of gear shifts selectively, said parts also being operable by another of said electro-magnets for return to neutral when in any gear shifting position.

21. In a gear shifting mechanism in combination, a plurality of electro-magnets, a member to be moved thereby in opposite directions from an intermediate position and to be returned to such position and commutable operative connections between said electro-magnets and said member including elements movable oppositely into a given relation by one of said electro-magnets and returnable to normal relation by another of said electro-magnets.

22. In a gear shifting mechanism, in combination, a plurality of electro-magnets, a pair of oscillatable members movable oppositely into one relation by one of said electro-magnets and returnable to normal relation by another of said electro-magnets, a member movable in opposite directions from an intermediate position for gear shifting and connections between said first and last mentioned members, certain of said connections being commutatable, whereby one electro-magnet serves to move said last mentioned member in either direction from its intermediate position and the other electro-magnet serves to return the same to its intermediate position.

23. In a gear shifting mechanism, in combination, a pair of oscillatable arms, a pair of solenoids having a common plunger to be moved thereby respectively in opposite directions for selectively moving said arms together and spreading the same, means to be operated by said arms for gear shifting and neutralizing and operative connections between said arms and said means, certain of said connections being commutatable for selectively effecting different gear shifting operations.

24. In a gear shifting mechanism, in combination, a pair of solenoids having a common plunger to be moved thereby in opposite directions, means including parts operable by movement of said plunger in one direction to effect a plurality of gear changes selectively and operable by movement of said plunger in a reverse direction for neutralizing and means to lock said plunger in all gear shifting positions of said first-mentioned means to prevent accidental release of the controlled gears.

25. In a gear shifting mechanism, in combination, a pair of solenoids having a common plunger to be moved thereby in opposite directions, means including parts operable by movement of said plunger in one direction to effect a plurality of gear changes selectively and operable by movement of said plunger in a reverse direction for neutralizing, a control switch for said solenoids and means associated with said switch and controllable by movement thereof to releasably lock said plunger in all gear shifting positions of said first-mentioned means.

26. In a gear shifting mechanism, in combination, a plurality of electro-magnets, means operable thereby for gear shifting and neutralizing, a casing therefor, and a control switch for said electro-magnets mounted in said casing and removable therefrom as a unit, said switch comprising contacts controllable in part by said means.

In witness whereof, I have hereunto subscribed my name.

WILLIAM C. STEVENS.